July 7, 1959  K. LEHOVEC  2,894,145
DOUBLE MODULATOR UTILIZING PHOTO EMISSIVE MATERIAL
Filed Nov. 18, 1952  3 Sheets-Sheet 1

INVENTOR.
KURT LEHOVEC
BY
Connolly and Hutz
HIS ATTORNEYS

July 7, 1959
K. LEHOVEC
2,894,145
DOUBLE MODULATOR UTILIZING PHOTO EMISSIVE MATERIAL
Filed Nov. 18, 1952
3 Sheets-Sheet 2
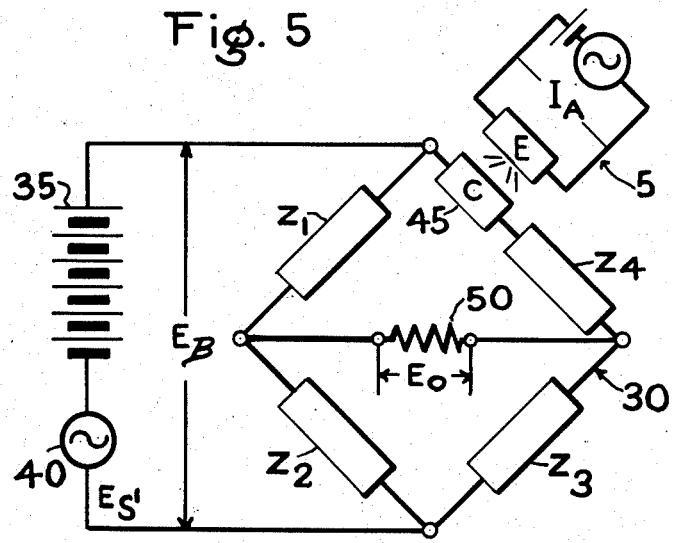
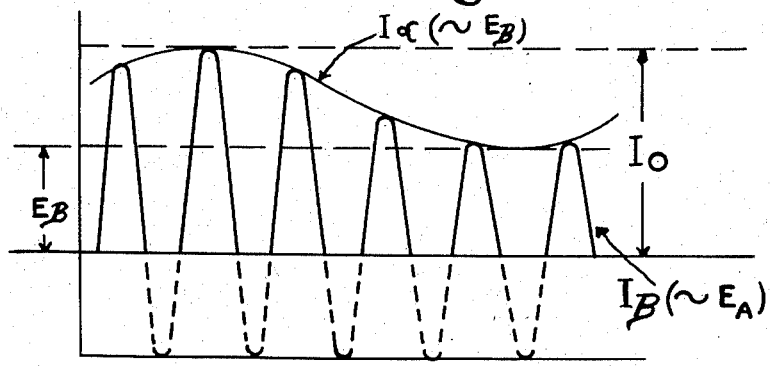
INVENTOR.
KURT LEHOVEC
BY
Connolly and Hutz
HIS ATTORNEYS INVENTOR.
KURT LEHOVEC
BY
Connolly and Hutz
HIS ATTORNEYS

United States Patent Office 2,894,145
Patented July 7, 1959

2,894,145

DOUBLE MODULATOR UTILIZING PHOTO EMISSIVE MATERIAL

Kurt Lehovec, Williamstown, Mass., assignor to the United States of America as represented by the Secretary of the Army Application November 18, 1952, Serial No. 321,254

3 Claims. (Cl. 250—210)

This invention relates to semiconductor translators and more particularly to a new type of luminescent semiconductor. Specifically, the invention relates to novel multiplex signal circuits employing semiconductor photon modulation in a manner not heretofore considered possible.

Certain types of photo-emissive and photo-sensitive electrical translators have long been known and used in the art for numerous applications. Examples of these prior art devices include the phosphors such as alkali halides, zinc sulphide and zinc silicate, as both luminescent and photo-sensitive translators. Other examples are the common photo-emissive cells (caesium, etc.), either vacuum or gas-type, photo-voltaic cells such as copper-oxide and photo-conductive cells such as selenium. These devices, while suitable for certain limited applications, are all subject to deficiencies as is well known in the art. In particular, there has been a long-felt need in this field for a simple, stable and rugged type of versatile light source which could supplant the present fluorescent and phosphorescent phosphor sources with their narrowly limited applications, as well as prototype lamps.

This disadvantage has been terminated by the discovery of new semiconductor photon modulators as set forth in my concurrent application, Serial No. 321,253, filed on even date with this application, and entitled "Photon Modulation in Semiconductors" (now Patent No. 2,776,367). The instant invention is concerned with the application of such devices in suitable networks to provide uniquely simple intelligence integration and differentiation systems.

As described more fully in said concurrent application, the new modulators comprise a semiconductive crystalline matrix having an integral n-p barrier and included substitutional and/or interstitial impurities, which in its broadest sense may consist of structural faults or anomalies in the atomic order, and which render the unit either luminescent under certain electrical stimulae or photon absorbent, or both.

The class of semiconductors suitable include silicon, germanium, silicon-carbide and natural and synthetic diamonds, as well as graded seal junction matrices such as germanium-silicon and tellurium-selenium. In most instances, the semiconductors include, in addition to the usual donor and acceptor impurities, at least one additional luminescense enhancing impurity selected from the group comprising zinc, copper, lead, tin, silver, manganese, thallium, bismuth, cerium, europium and samarium. However, certain semiconductors may fluoresce without need of deliberately added activators, as set forth more fully in said concurrent application.

When a minimum potential difference, exceeding 3 volts for silicon-carbide, is applied across such semiconductor in a forward direction, it luminesces with an intensity proportional to the current passed. This is attributable to the injection of charge carriers from one side of the n-p barrier to the other and a subsequent optical recombination. The theory explaining this operation is fully set forth in said concurrent application.

Another type of a semiconductor light source modulated by an external electric signal and more fully described in said concurrent application consists in passing an external source light beam through a region adjacent to a p-n barrier of a semiconductor, which semiconductor is biased in the forward direction, so that the electrons and holes injected over the p-n barrier modulate the absorption undergone by the light beam in passing through the semiconductor.

The instant invention has for its primary purpose the application of such new light sources in combination with light-sensitive recorders or receivers in such a manner as to permit integration or differentiation between diverse electrical signals.

In one preferred form of the invention a semiconductor light source is arranged to cooperate with a light-sensitive cell in an electrical network whereby the output of the network may represent either, the summation of two values represented by signals in the network, a selected one of such input signals, or a heterodyning signal generator.

A second form of the invention relates to a frequency analyzer.

Another form of the invention is directed to providing novel circuit components for analogue computers.

A still further form of the invention is directed to a system for high fidelity amplification.

The invention may be described broadly as comprising a semiconductor light source and a light-sensitive (photoconductive) receiver. The latter may be either a semiconductor of the type set forth in said concurrent application or a conventional photo-emissive or photo-conductive cell. The source or emitter and receiver or collector cell, as they will be hereafter designated, are arranged to cooperate together with respect to an electrical network, which in each instance, may be pre-controlled or set to provide unique results.

Reference will now be made to the drawings in more fully describing certain specific embodiments of the invention, and in which:

Fig. 5 is an illustration of one form of the invention employing a balanced network;

Fig. 6 is a graphical analysis of the action of circuit of Fig. 5;

Figure 1:
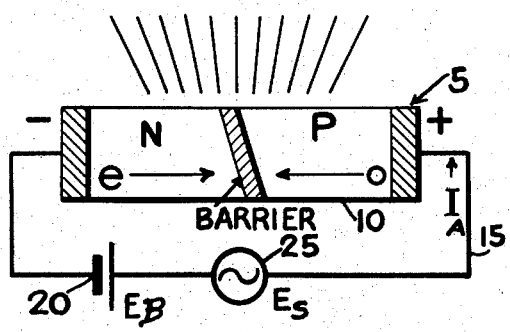
Fig. 1 illustrates a semiconductor light source according to the instant invention.

As illustrated in Fig. 1, the semiconductor light sources according to the invention comprise a semiconductor crystalline matrix 10 having p- and n-type conductivity regions juxtaposed on opposite sides of a central high resistance barrier layer. As shown, the matrix 10 includes only one such barrier, but it will be readily understood that the invention is applicable to matrices employing a plurality of such barriers. The energizing circuit 15 is connected via low ohmic contacts to the respective ends of the matrix 10 and includes a bias source 20 ($E_B$) and a signal source 25 ($E_S$). The values assigned to the bias 20 and the signal 25 will differ according to the particular semiconductor utilized, as set forth more fully in said concurrent application, but may be broadly defined as equal to a potential difference across the barrier device of between 3 and 50 volts, the potential drop $E_A$ across the crystal being equal to $E_B$ plus or minus $E_S$ and producing an activating current $I_A$. In the case of silicon carbide, either with or without activator impurities, luminescence occurs with a potential difference of only 3 volts, the drop being preferably limited under 30 volts. With germanium or silicon impurity activated sources, graded seal junction semiconductors or diamonds, the minimum potential difference will vary in relation to the energy value of their absorption edge.

Figure 2:
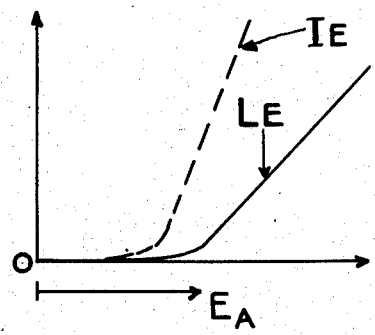
Fig. 2 is a graph illustrating the relation of various phenomena in the semiconductor of Fig. 1.

In any case the intensity of the light emitted will be substantially proportional to the current (charge carriers) passing across the barrier due to the fact that the luminescence results from the recombination of minority and majority carriers injected into opposite regions on each side of the barrier. This action is graphically illustrated in Fig. 2 wherein the abscissa represents the increase in the potential $E_A$ and the ordinate represents the increase in light intensity or quanta $hv$. The solid line curve $L_E$ represents the increase in intensity with an increase in the applied potential, while the dashed curve $I_E$ represents the conductivity increase with applied potential. It will be noted that both $L_E$ and $I_E$ increase exponentially with $E_A$ and that $L_E$ varies proportionally with $I_E$ in a linear manner.

Figure 3:
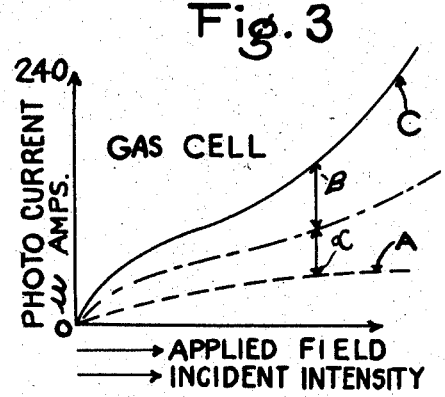
Figs. 3 and 4 are characteristic graphs of conventional photo-emissive cells and a photo-conductive cell.

In view of the nearly linear relationship between the parameters of light and current passed through the barrier, it has been discovered that the semiconductor light source may be advantageously combined with conventional photo-emissive and photo-conductive light-sensitive cells in a manner not heretofore contemplated. The basic premise of the instant invention may be more readily understood from an inspection of Figs. 3 and 4. Fig. 3 is a graphical illustration of the variations in photocurrent in a photo-emissive gas cell of a conventional commercial type. In the figure, the abscissa represents an increase in the applied field across the cell electrodes as well as an increase in incident intensity, while the ordinate represents variations in photocurrent. The curve A depicts variations in the dark current due to the applied potential and indicates that it reaches a relatively stable value at some particular value of the applied field. Curve B represents a change in photocurrent due to changes in the applied cell potential, while curve C represents changes in photocurrent due to changes in incident light intensity. It will thus be apparent that the photocurrent flowing in the circuit of a conventional gas cell represents three different values, two of which vary in accordance with two separate external factors.

If a linear or substantially linear or proportional relationship existed between the curves B and C, it would be readily possible to use an incident light source providing an increase in photocurrent $I\beta$ proportional to its intensity and combine it with an increase in photocurrent due to increases in the applied cell potential $\alpha$, so that the output would represent the product of the components as the total photocurrent. This is not strictly possible with gas cells due to the fact that the ionization in the cell, which is responsible for the larger amount of photocurrent, does not vary in direct relationship to the incident photocurrent. However, it is possible to select a portion of curves B and C which have substantially linear relationships and to confine changes in photo-current to this region whereby the desired result may be obtained.

Figure 4:
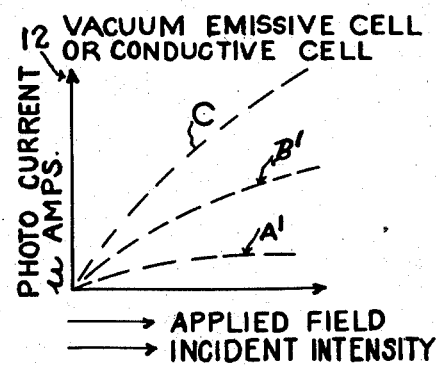

Fig. 4 is a graphical illustration of the characteristics of photo-conductive cells or vacuum-emissive cells, the only distinction being that the current of the former is at least ten times that of the latter, and wherein similar subscripts denote similar characteristics. In this case the curves do bear a substantial linear relationship throughout a large portion of their extent and make such type cells ideal ones for the purposes of the instant invention. These units suffer, however, from the fact that the vacuum cell has very low photocurrent generation and thereby limited output; while the photo-conductive cell (such as selenium) is acutely affected by the applied potential, which in most instances, must be kept relatively low to retain the linear relationship desired.

Photovoltaic cells produce a photocurrent which is much greater than that in the gas or vacuum but less than the photoconductive cells, but the external resistance must be very low. It will thus be apparent that the output of the latter cell is very small, in the millivolt range, as opposed to the output of the gas-emissive and photoconductive cells which may constitute a substantial voltage with photocurrents as high as 140 microamps. and a circuit resistance as high as one megohm. It will therefore be apparent that the different type cells must have different applications which are not interchangeable or compatible.

Fig. 5 illustrates a form of the invention in which a gas-type cell C, having the characteristics of Fig. 3, is interposed in a balancing network 30. A semiconductor light source 5, having a semiconductive crystalline emitter E juxtaposed near cell collector C, is positioned adjacent the network and adapted to produce a varying intensity of light quanta proportional to a signal current $I_A$. The network 30 includes a plurality of impedance arms $Z_1$, $Z_2$, $Z_3$, and $Z_4$ which may be variable and are adapted to balance the dark current (indicated by the curve A in Fig. 3) inherent in collector cell C. Across the null of the bridge network is provided a resistance 50 from which an output potential $E_O$ may be taken. An energizing circuit including a biasing source 35 and a signal source 40 is applied across the input terminals of the network and is adapted to develop an applied signal potential $E_B$. This potential $E_B$ may be chosen to be of an extent which coincides with the substantial linear portions of curves C and B in Fig. 3 whereby a finite relationship exists between variations in potential $E_B$ and the photocurrent produced in collector cell C. In practice, this may be attained by designing the battery 35 to be approximately 60 volts while the source 40 may be an alternating potential of 20 volts. The resulting potential $E_B$ applied across the terminals of the bridge will vary between 40 and 80 volts which coincides with the linear portions of curves B and C.

With this arrangement in the network 30, an unbalancing potential development will be directly proportional to the photocurrent output of the collector cell C, depending upon the variations in $E_B$ and $E_A$ as superimposed within the cell and independent of the dark current. This photocurrent will flow across the resistor 50 and develop an output voltage $E_O$ representing the instantaneous product of the signals A and B.

This unique arrangement may be availed of as a heterodyning signal generator in which case the signal A may be of one frequency while signal B of a second frequency. The output $E_O$, in addition to containing the components of each output signal, will contain the difference frequency components A plus or minus B in the usual manner.

It will also be apparent that the network of Fig. 5 is readily adaptable for power measurement in arbitrary wave shapes wherein signal $I_A$ may represent a value in accordance with an external circuit current $I_X$, while the signal voltage $E_B$ may vary in accordance with the external circuit voltage $E_X$. In such case the output across the resistor 50 represents the instantaneous product of signals A and B and thereby indicates the instantaneous power in such external circuit; the power factor being inherently accounted for by the operation of the collector cell C. If desired, a suitable calibrated measuring instrument may replace resistor 50.

When the measurement is of A.C. values, the respective impedances $Z_1$, $Z_2$, $Z_3$, and $Z_4$ should be so adjusted that the Q's of each leg will be the same in order to avoid production of a phase shift.

In cases where the network of Fig. 5 is used for modulation purposes the character of the collector cell C will determine the mode of operation. As for example, as illustrated in Fig. 6, the photocurrent $I\beta$ variations due to the emitter current $I_A$ may represent a carrier current upon which is superposed a modulation factor or envelope corresponding to the photocurrent $I\alpha$ (proportional to variations in $E_B$) to produce a modulated current envelope $I_0$. In the instant example, the emitter of the light source circuit 5 is biased at a low potential, as for example 3 volts, and the signal potential (25 in Fig. 1) varies at the same value whereby the carrier envelope $I\beta$ of Fig. 6 constitutes halfwave pulses due to the rectifying action of the emitter. It will be apparent, of course, that the potential bias across the emitter may be such that the signal (25 in Fig. 1) merely changes the relative intensity of the emission so that the envelope $I\beta$ would represent full sine waves.

In the above example, the cell 45 is a photo-emissive cell and accordingly the frequency of the light emanations from the emitter E may vary at a high rate depending upon the limit of the crystalline emitter, which has been found to be higher than 2,000,000 cycles per second.

The network in Fig. 5 may alternatively be used in an analogue computer mechanism as a component in substitute for present conventional type function generator networks. As previously described, the Fig. 5 network produces a photocurrent which is the instantaneous product of the signals $E_A$ and $E_B$ and the system is inherently adapted for use in integration operations of the nature $V_Z$=to $Kf(V_XV_Y)$, where $f$ stands for a predetermined functional variation. In accordance with the instant invention the current $I_A$ in accordance with voltage $E_A$ may constitute the variable factor $V_X$, while the voltage $E_B$ will constitute the variable factor $V_Y$, the product function $V_Z$ being represented by the output of the network $E_O$. In this instance the predetermined functional variation $f$ may be provided by variations in the impedance components of the network, as for example, resonant circuits which may still maintain a balanced condition for zeroing the dark current of the cell.

Preferably, however, the functional component is introduced by the element 50 which may constitute a variable impedance of the varistor type. Commercially available varistors vary widely in their inherent characteristics and can be manufactured to contain desirable characteristics within wide limits. Further, the varistor resistance may be independent of polarity or not, as desired. As a result the output voltage $E_O$, developed across the varistor, will vary as the product of the function represented by the varistor characteristics and the photocurrent of collector cell C.

Figure 7:
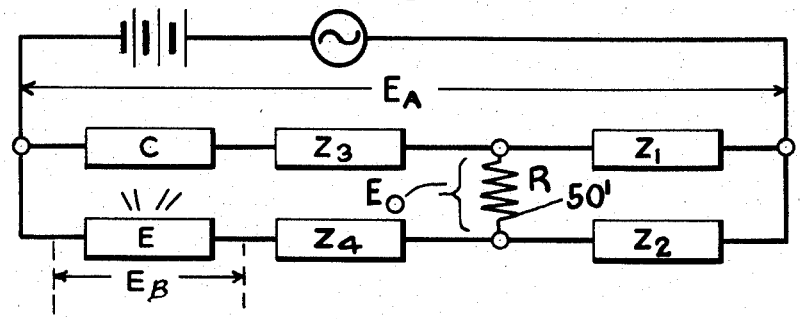
Figs. 7, 8 and 9 illustrate the application of the invention to particular component arrangements for analogue computers.
Figure 8:
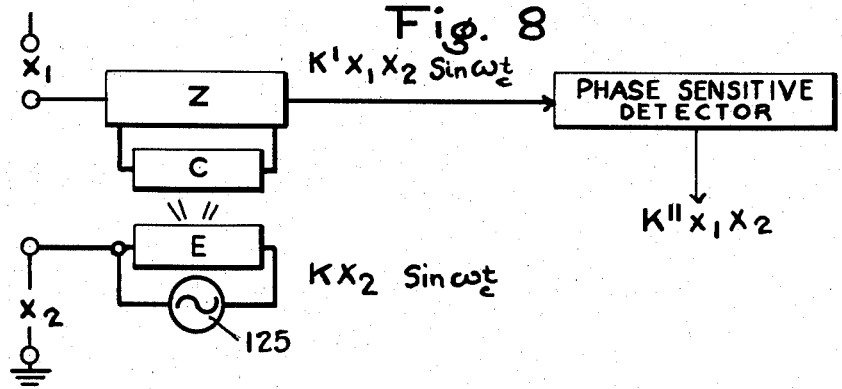
Figure 9:
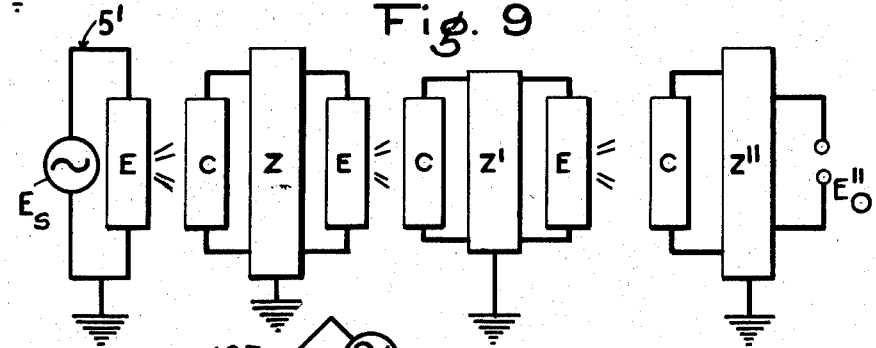

Figs. 7, 8 and 9 illustrate other applications of the instant invention to components of analogue computer mechanisms. In Fig. 7 the emitter E is mounted in one leg of a balanced network in a position directly opposing the collector cell C in an adjacent leg of the network. A variable voltage $E_A$ is then superimposed across the terminals of the network in a manner similar to that previously described to produce an output across a null resistor 50'. This form of the invention differs, however, from that described in Fig. 5 in that no external bias or signal source is used for the semi-conductor light source E and reliance is placed upon the variation of the network parameters $Z_1$ through $Z_4$, inclusive, to provide the proper potential drop across the light source E.

This form of the invention represents another type of function generator in which the output voltage $E_O$, developed across the null resistor 50', may vary as a direct function of the input voltage $E_A$. This results from the fact that the voltage $E_B$, developed across the emitter, is in turn dependent upon the input voltage $E_A$ and the circuit parameters. The voltage $E_B$ in turn controls the emission of light and since the output of collector cell C is proportional to the applied potential of field $E_A$ and the incident light intensity from emitter E, the potential across resistor 50' will vary as a direct function of the input voltage $E_A$, i.e. $E_O=f(E_A)$. Various types of functions may be introduced into the network by the choice of suitable parameter values in a manner well known in the art, as for example, by the use of simple impedance parameters such as tuned circuits, varistors and bolometers.

An obvious advantage of the instant invention is as a substitute for conventional photoformers resulting in a great saving in space and weight in addition to eliminating the need for the complexity of control networks which are a necessary incident to the use of the cathode ray tubes in such photoformers.

Fig. 8 illustrates a further analogue computer component which may constitute a substitute for present multipliers of the curvature modulator type. As illustrated, the semiconductor light source E is positioned directly opposite a collector cell C and is connected through a terminal to an input voltage representing a value $X_2$. This value is subjected to the modulating action of the signal generator 125 connected across the semiconductor barrier in the manner described with respect to Fig. 1 to produce luminescence of an intensity varying in accordance with the term $KX_2 \sin \omega_c t$. This value is received by the collector cell C in the form of incident light. The cell is in turn energized by an applied potential representing the value $X_1$, whereby the resultant photocurrent output may represent the product of the values mixed in the collector and equal to $k'X_1X_2 \sin \omega_c t$. The value X is preferably applied to cell C via a network. This product value is then fed into a phase sensitive detector wherein the sine wave variations are removed to produce an output equal to $k''X_1X_2$.

The instant invention is also eminently suitable for use as a limiter in function generator circuits (as described previously) wherein no luminescence may occur unless and until the bias or signal voltage reaches a specific value, and due to the fact that the photocurrent produced in the collector cell C (particularly when using vacuum-emissive or photo-conductive types) has an upper limit of generation beyond which increased intensities are ineffective. Thus the combined emitter and collector permit an input signal emitter as a unit pulse to have a generated output signal limited to a definite value.

Fig. 9 illustrates a further modification of the invention which is also particularly useful in analogue computers. The figure depicts an amplification network containing sections corresponding to conventional cascaded D.C. amplifiers which are used to step up the D.C. values. In conventional circuits, however, it is necessary to maintain a common ground level which is difficult to attain without using complex wiring arrangements. The instant invention obviates such difficulty by coupling the respective sections in series relationship through an emitter E and collector cell C, as previously described. As shown, an initial light source circuit 5' energizes an emitter E in accordance with a control signal $E_S$. This signal is then relayed through the succeeding amplification stages Z, Z' and Z'' by the photon coupling between the respective collectors and emitters. As a result all stages may be maintained at a common ground level as shown.

Alternately, the sections Z, Z' and Z'' may comprise separate stages of D.C. vacuum or gas tube amplifiers wherein the direct coupling is provided via the emitters and collectors. The amplifier sections Z, Z' and Z'' may constitute balanced bridge networks as described previously with respect to Figs. 5 and 7, in which case the amplification is obtained by virtue of the photon modulation per se. It is thus possible to use the same plate voltage supply for all stages, a feat which is difficult to accomplish with conventional cascading circuits.

Figure 10:
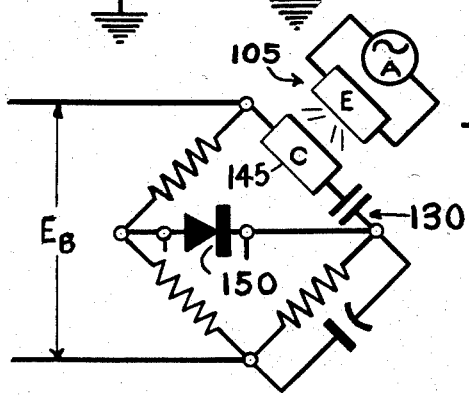
Fig. 10 illustrates a further modification of the invention.

The form of the invention illustrated in Fig. 10 represents a simple frequency analyzer unit employing a balanced bridge network of the Wien type. Here, the varying potential applied across the emitter E of light source 105 may constitute a complex wave having multiple frequency components, while the signal voltage $E_B$, applied across the input terminal of the bridge, may constitute a fixed frequency signal of variable magnitude provided by a sine wave generator. As is well known, a superimposition of sine waves having amplitudes equal to $E_A$ and $E_B$ with the difference frequency equal to $\omega/2\pi$ results in the production of a modulated envelope having a value equal to the square root of the sum of the squares of the average input signals plus twice the product of such signals at the beat or difference frequency. The shape is identical to the wave output of a full wave rectifier when the superimposed voltages are of equal magnitude and will approach a sine wave variation only when the amplitude of one is extremely small as compared to the other.

The bridge signal $E_B$ may be adjusted to equal the desired frequency component contained in signal $E_A$ to provide a convenient means for ascertaining the value of such component by rectifying the output derived across the null points of the bridge, as by means of a detector 150. The output of the rectifier will therefore vary in magnitude at the difference frequency (in this case zero) and may consequently be measured in the output circuit of the detector as a D.C. value. This rectified current is also a function of the phase relationship between the components $E_A$ and $E_B$ of equal frequency. Thus by incorporating a phase shifting circuit (not illustrated) with the sine wave generator, it is possible to not only compare the amplitude of the various frequencies but also their phase relationship to the signal $E_B$.

This phase shifting device alternatively may be incorporated into the bridge as one of the legs. By this means the output voltage developed across the null points may be shifted in the phase from 0° to 180° with no change in amplitude. In some instances (high frequency work), it will be desirable to use a twin T-network in lieu of that illustrated.

Preferably the detector 150 includes an output circuit having a variable resistance by which residual D.C. due to the plate circuit bias may be balanced out in the absence of a signal voltage.

A convenient and efficient arrangement for a frequency analyzer according to the instant invention may comprise a semi-conductor light source having means for varying the emitted light intensity at a signal value equal to a superimposition of various frequencies, a light-sensitive collector cell of the photo-voltaic type and a crystal detector. In this instance, the output developed across the null points of the bridge may be controlled to lie in the millivolt region, which region is also the most effective value for utilizing crystal detectors as square wave rectifiers. The entire device will be a size which compares favorably with printed circuit techniques; the bridge and network components may be provided by the use of screening, plating or painting methods used in commercial printed circuits. Further, since it is only necessary to compare wave components, the bias of the signal voltages may be kept low.

A further form of the invention may comprise a high impedance potential source connected across a plurality of semi-conductor light sources in series. The light quanta emitted from each source may be collected by a single cell to produce a photocurrent equal to the summation of emissions from all cells. In this manner, good amplification may be obtained. The sources may be physically oriented to balance out any emission delay factor.

It will be apparent that semiconductor light sources, such as are described in said copending application (e.g. graded seal junction) may be used as the light-sensitive photo-conductive cell in lieu of the types previously mentioned. In such case, the dual material silicon-germanium or selenium-tellurium cell provides an added advantage in that each such cell unit has a separate absorption edge for each of the matrix materials whereby its utility is doubled. These graded seal junction semiconductors may thus be used with two different source wave lengths corresponding to the absorption edge of each matrix material.

Alternately, a photo-modulation unit such as that disclosed in said copending application and which includes a long wave length light source and an interposed semiconductor light modulator may be substituted for the instant type light source, as for example, in place of the circuit 5 in Fig. 5. In such case the collector cell C would preferably comprise a germanium light sensitive semiconductor biased in the blocking direction. With this arrangement an infrared light source would be positioned to direct a light beam of approximately 1.5 microns adjacent the barrier region of the cell C, after passing through a silicon semiconductor modulator biased in the forward direction at a value and rate dependent upon the intelligence desired to be transmitted. The light beam incident upon the cell C would thus be modulated by the photo-modulator in a manner more fully described in said copending application to produce a photocurrent in the bridge circuit of Fig. 5 dependent upon the modulated incident light beam and the normal current flow in the cell due to the biasing potential.

As many apparently widely different embodiments of this invention may be made without departing from the spirit and scope hereof, it is to be understood that the above invention is not limited, except as defined in the appended claims.

What is claimed is:

1. A photon modulation system including a semi-conductor light source, a light-sensitive cell for producing a photo current dependent upon applied electrode potential and incident light, an impedance network, means providing a potential having a band of frequency components for modulating the intensity of the light emitted from said light source, means for providing a potential across said light-sensitive cell of a fixed frequency and adjustable amplitude whereby said cell produces a photo current in said network which is proportional to the instantaneous summation of said modulations said impedance network including phase shifting means and a square law detector to detect any band frequency component at said fixed frequency.

2. A photon modulation system including a semi-conductor light source, having a substantially linear relationship between light output and current, a light-sensitive cell arranged to receive light from said light source for producing a photo current dependent upon applied electrode potential and incident light, an impedance network connected to said cell, means for providing a potential comprising a band of frequency components to be analyzed for modulating the intensity of the light emitted from said light source and means for providing a potential of adjustable frequency and adjustable amplitude across said light-sensitive cell and a square law detector connected in said network to detect any band frequency component which is the same frequency as said potential of adjustable frequency, whereby the amplitude of each frequency component in said band of frequency components may be determined.

3. The combination set forth in claim 2 in which said network includes phase shifting means whereby the phase and amplitude of each frequency component in said band of frequency components may be determined.

References Cited in the file of this patent

UNITED STATES PATENTS 2,050,737    Schriever _____ Aug. 11, 1936

(Other references on following page)

UNITED STATES PATENTS

| | | |
|---|---|---|
| 2,145,591 | Fitzgerald | Jan. 31, 1939 |
| 2,318,470 | Dimmick | May 4, 1943 |
| 2,385,086 | D'Agonstino et al. | Sept. 18, 1945 |
| 2,401,404 | Bedford | June 4, 1946 |
| 2,442,823 | Polye | June 8, 1948 |
| 2,504,627 | Benzer | Apr. 18, 1950 |
| 2,524,035 | Bardeen et al. | Oct. 3, 1950 |
| 2,524,478 | Rutherford et al. | Oct. 3, 1950 |
| 2,557,691 | Rieber | June 19, 1951 |
| 2,573,113 | Simmon | Oct. 30, 1951 |
| 2,582,831 | Hester | Jan. 15, 1952 |
| 2,617,042 | Wouters | Nov. 4, 1952 |
| 2,650,310 | White | Aug. 25, 1953 |
| 2,650,311 | Bray et al. | Aug. 25, 1953 |
| 2,683,794 | Briggs et al. | July 13, 1954 |
| 2,692,952 | Briggs | Oct. 26, 1954 |
| 2,697,201 | Harder | Dec. 14, 1954 |
| 2,794,863 | Van Roosbroeck | June 4, 1957 |